United States Patent Office 2,891,085
Patented June 16, 1959

2,891,085

O-(2,4,5-TRICHLOROPHENYL) O-METHYL O-ALKYL PHOSPHOROTHIOATES

Edgar C. Britton, Etcyl H. Blair, and Henry Tolkmith, Midland, Mich., assignors to The Dow Chemical Company, Midland, Mich., a corporation of Delaware No Drawing. Application June 25, 1956
Serial No. 593,321

5 Claims. (Cl. 260—461)

This invention is concerned with the O-(2,4,5-trichlorophenyl) O-methyl O-alkyl phosphorothioates having the formula

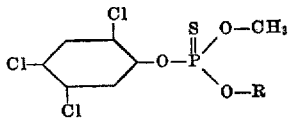

in which R represents an alkyl radical containing from two to five carbon atoms, inclusive. These new compounds are viscous liquids somewhat soluble in many organic solvents and substantially insoluble in water. They have been found to be active as parasiticides and are adapted to be employed as active toxic constituents of compositions for the control of nematodes and insect organisms such as flies, roaches and aphids.

The new compounds may be prepared by several methods. In one method of preparation, an aliphatic alcohol such as ethyl alcohol, propyl alcohol, butyl alcohol or amyl alcohol is reacted in the presence of pyridine as a hydrogen chloride acceptor with O-(2,4,5-trichlorophenyl) O-methyl phosphorochloridothioate of the formula

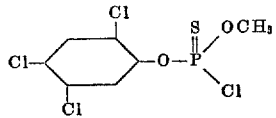

The reaction is exothermic and takes place smoothly at the temperature range of from $-10°$ to $30°$ C. with formation of the desired product and pyridine hydrochloride of reaction. The temperature may be controlled by regulating the rate of contacting the reactants and by external cooling. Good results are obtained when employing at least one molecular proportion of the alcohol with each molecular proportion of the phosphorochloridothioate.

In carrying out the reaction, pyridine dissolved in the alcohol reactant is added portionwise to the phosphorochloridothioate dissolved in the same alcohol. This operation is carried out with stirring and at a temperature of from $-10°$ to $30°$ C. Upon completion of the reaction, the desired product is separated in conventional fashion.

In an alternative procedure, the O-(2,4,5-trichlorophenyl) O-methyl O-alkyl phosphorothioate compounds of the present invention may be prepared by reacting an alkali metal alcoholate with O-(2,4,5-trichlorophenyl) O-methyl phosphorochloridothioate. The reaction is exothermic and takes place smoothly at temperatures of from $-10°$ to $30°$ C. The temperature may be controlled by regulating the rate of contacting the reactants and by external cooling. Good results are obtained when employing substantially equimolecular proportions of the reactants. The reaction may be carried out in a solvent such as benzene or methylene chloride and conveniently in the alcohol employed in the preparation of the alcoholate. In carrying out the reaction, the alcoholate, preferably as the sodium salt, is added portionwise at the reaction temperature to the phosphorochloridothioate dissolved in the reaction solvent. Upon completion of the reaction, any alcohol solvent may be removed by evaporation and the residue dispersed in a water immiscible solvent such as benzene and thereafter washed with water. The solvent is then removed by evaporation or fractional distillation under reduced pressure to obtain the desired product as a residue.

The following examples illustrate the invention but are not to be construed as limiting.

EXAMPLE 1

*O-(2,4,5-trichlorophenyl) O-methyl O-ethyl phosphorothioate*

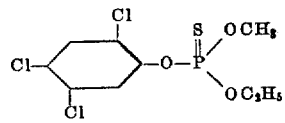

A solution of 0.5 mole of sodium ethylate in 500 milliliters of ethyl alcohol was added portionwise with stirring to 163 grams (0.5 mole) of O-(2,4,5-trichlorophenyl) O-methyl phosphorochloridothioate dissolved in 500 milliliters of benzene. The addition was carried out over a period of one hour and at a temperature of from $10°$ to $15°$ C. Following the addition, the reaction mixture was washed with water and the organic layer separated and dried. Upon evaporation of the benzene under reduced pressure, there was obtained an O-(2,4,5-trichlorophenyl) O-methyl O-ethyl phosphorothioate product as a yellow, viscous liquid having a refractive index $n/D$ of 1.5518 at $25°$ C. and a chlorine content of 31.93 percent as compared to the theoretical value of 31.69 percent.

EXAMPLE 2

*O-(2,4,5-trichlorophenyl) O-methyl O-n-propyl phosphorothioate*

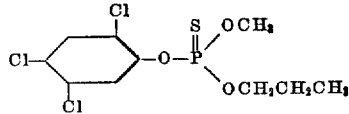

Twenty grams (0.25 mole) of pyridine dissolved in 50 milliliters of n-propyl alcohol were added portionwise with stirring to 81.5 grams (0.25 mole) of O-(2,4,5-trichlorophenyl) O-methyl phosphorochloridothioate dissolved in 125 milliliters of n-propyl alcohol. The addition was carried out in 30 minutes and at a temperature of $10°$ C. After the addition, the reaction mixture was stirred for two hours while the temperature was allowed to increase to $25°$ C. Methylene choride was then added and stirring continued for another two hours. The alcohol and methylene dichloride were removed by evaporation and the residue diluted with 250 milliliters of methylene chloride and water. The resulting mixture was washed successively with water and dilute aqueous sodium carbonate and dried over calcium sulfate. The solvent was then removed by distillation under reduced pressure to obtain an O-(2,4,5-trichlorophenyl) O-methyl O-n-propyl phosphorothioate product as a viscous liquid residue having a refractive index $n/D$ of 1.5525 at $25°$ C. and a chlorine content of 30.15 percent compared to the theoretical value of 30.30 percent.

EXAMPLE 3

*O-(2,4,5-trichlorophenyl) O-methyl O-isopropyl phosphorothioate*

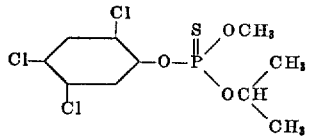

Six grams (0.25 mole) of sodium was dissolved in 100 milliliters of isopropyl alcohol to prepare a solution of sodium isopropylate. This solution was added portionwise with stirring to 81.5 grams (0.25 mole) of O-(2,4,5-trichlorophenyl) O-methyl phosphorochloridothioate in 100 milliliters of methylene chloride. The addition was carried out in one hour and at a temperature of from 10° to 12° C. The mixture was then stirred for another two hours and allowed to come to room temperature. After standing overnight, the sodium chloride of reaction was filtered off and the methylene dichloride and excess alcohol removed by evaporation. The residue was taken up in 200 milliliters of methylene chloride, washed several times with water and dried over calcium sulfate. The drying agent was removed by filtration and the solvent evaporated under reduced pressure. As a result of these operations there was obtained an O-(2,4,5-trichlorophenyl) O-methyl O-isopropyl phosphorothioate product as a yellow liquid residue. This product had a refractive index $n/D$ of 1.5456 at 25° C. and a chlorine content of 30.30 percent as compared to the theoretical value of 30.40 percent.

EXAMPLE 4

*O-(2,4,5-trichlorophenyl) O-methyl O-secondarybutyl phosphorothioate*

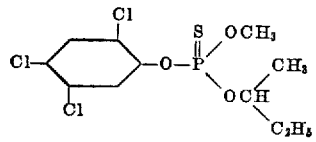

This compound is prepared in a manner similar to that described in Example 3 by the reaction of equimolecular proportions of the sodium salt of secondary butyl alcohol and O-(2,4,5-trichlorophenyl) O-methyl phosphorochloridothioate. The product has a molecular weight of 350.

EXAMPLE 5

*O-(2,4,5-trichlorophenyl) O-methyl O-(2-methylbutyl) phosphorothioate*

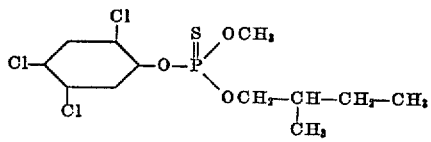

4.4 grams (0.19 mole) of sodium was dissolved in 700 millimeters of 2-methyl butanol. This solution was added portionwise with stirring to 62.4 grams (0.19 mole) of O-(2,4,5-trichlorophenyl) O-methyl phosphorochloridothioate in 200 milliliters of 2-methyl butanol. The addition was carried out in one hour and at a temperature of from 5° to 8° C. After standing overnight, the reaction mixture was filtered and the excess alcohol removed by evaporation. The residue was then dissolved in 800 milliliters of benzene and the resulting solution washed with water. Upon evaporation of the benzene, there was obtained an O-(2,4,5-trichlorophenyl) O-methyl O-(2-methylbutyl) phosphorothioate product as a viscous liquid residue. This product had a refractive index $n/D$ of 1.5498 at 20° C. and a phosphorus content of 8.26 percent compared to the theoretical value of 8.22 percent.

The new compounds have been found to be effective as parasiticides and are adapted to be employed for the control of a wide range of insect and bacterial organisms. They are of very low phytotoxicity to plants and plant parts and may be applied to the seeds and foliage of plants in amounts required for parasite control with negligible plant injury. For such use the products may be dispersed in water with the aid of a wetting agent and the resulting aqueous suspensions employed as sprays, or dispersed on a finely divided solid and employed as dusts. The products may also be employed in oils, as constituents of oil in water emulsions or in water dispersions with or without the addition of dispersing or emulsifying agents. In a representative operation, 100 percent controls of root knot nematodes have been obtained with aqueous compositions containing ten parts by weight of O-(2,4,5-trichlorophenyl) O-methyl O-isopropyl phosphorothioate per million parts by weight of ultimate mixture.

O-(2,4,5-trichlorophenyl) O-methyl phosphorochloridothioate employed as a starting material as previously described is a crystalline solid melting at 37°–38° C. This product may be prepared by the methods disclosed in a copending application, Serial No. 581,284, filed April 30, 1956.

We claim:

1. An O-(2,4,5-trichlorophenyl) O-methyl O-alkyl phosphorothioate having the formula

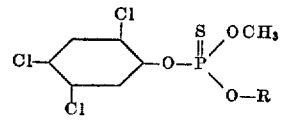

wherein R represents a member of the group consisting of the alkyl radicals containing from two to five carbon atoms, inclusive.

2. O-(2,4,5-trichlorophenyl) O-methyl O-ethyl phosphorothioate.

3. O-(2,4,5-trichlorophenyl) O - methyl O - n - propyl phosphorothioate.

4. O-(2,4,5-trichlorophenyl) O-methyl O-isopropyl phosphorothioate.

5. O-(2,4,5-trichlorophenyl) O-methyl O-(2-methylbutyl) phosphorothioate.

References Cited in the file of this patent

UNITED STATES PATENTS

| | | |
|---|---|---|
| 2,599,516 | Moyle | June 3, 1952 |
| 2,657,229 | Orochena | Oct. 27, 1953 |
| 2,761,806 | Boyer | Sept. 4, 1956 |